Feb. 15, 1927.

A. VARGA 1,617,729

NONSKIDDING DEVICE FOR AUTOMOBILES

Filed Aug. 26, 1925

INVENTOR.
Alexander Varga
BY
ATTORNEYS.

Patented Feb. 15, 1927.

1,617,729

UNITED STATES PATENT OFFICE.

ALEXANDER VARGA, OF DUNGLEN, OHIO.

NONSKIDDING DEVICE FOR AUTOMOBILES.

Application filed August 26, 1925. Serial No. 52,546.

This invention relates generally to pneumatic automobile tires of all classes and sizes, the invention having particular reference to a novel type of antiskid and traction device. The invention has for an object the provision of an improved combination device which will lengthen the life and wearing qualities of the tire as well. A further object is to provide a device which may be easily applied to the tire, and which may be readily changed as the conditions of the road surface may require.

For further comprehension of the invention, and of the objects and advantages thereof, reference will be had to the following description and accompanying drawing, and to the appended claim in which the various novel features of the invention are more particularly set forth.

Fig. 1 of the drawing is a side elevational view of my improved automobile tire device as applied to a tire.

Figure 1:
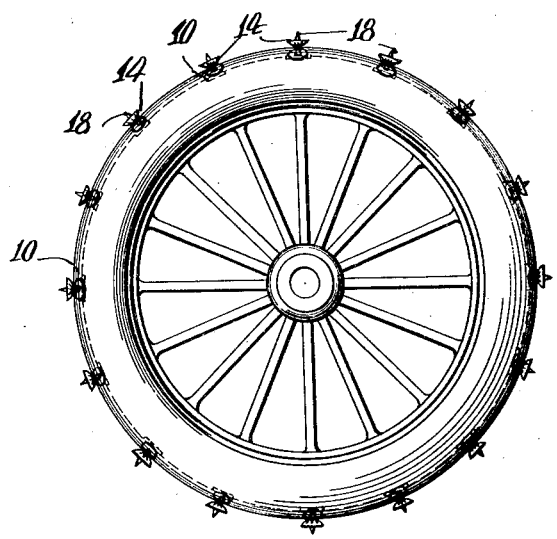

As here embodied my improved automobile tire device comprises briefly a series of plates 10 placed in spaced relation inside and crosswise of the tire, or else what is known in the trade as a shoe; or a single strip 11 may be placed inside the shoe and running lengthwise of said shoe. The plates 10 or strip 11 may be of any suitable metal having a plurality of tapped holes, as shown at 12 and 13 in the drawing, the number of said holes and the spacing of said plates, or the number of tapped holes in said strip, depending upon the size of said shoe. To accommodate the studs 14, suitable holes are forced or punched in said shoe, to permit of inserting and screwing the shanks 15 of said studs into the said tapped holes in said plate or said strip, the said studs each having a threaded portion at its lower extremity, and being formed or turned at the other extremity so as to make a conical shaped head 16, said conical shaped head having a threaded or tapped hole 17 to accommodate the antiskid or traction device 18, said antiskid or traction devices being of various shapes or contours as designated by 18 in the drawing.

Figure 2:
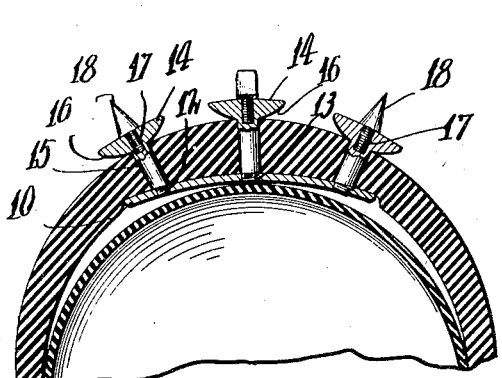
Fig. 2 is a transverse sectional view of one of the units of my improved automobile tire device as shown in said Fig. 1.
Figure 3:
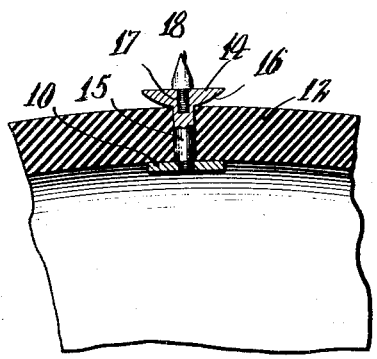
Fig. 3 is a longitudinal sectional view of my improved automobile tire device shown in Fig. 1.
Figure 4:
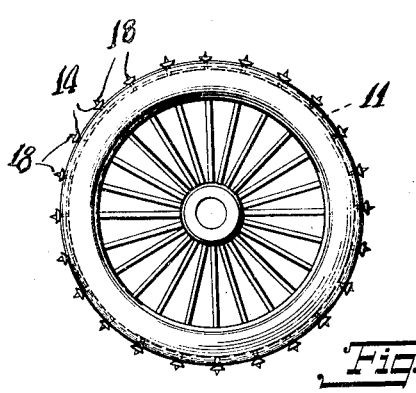
Fig. 4 is a side elevational view of a modification of my improved automobile tire device as applied to a tire.
Figure 5:
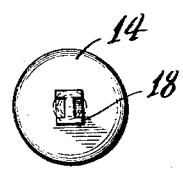
Fig. 5 is a detail plan view of one of the studs and antiskid or traction spike.
Figure 6:
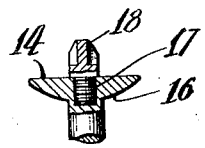
Fig. 6 is a fragmentary side sectional view of said Fig. 5.

Referring in particular to the application of my improved automobile tire device to the tire: the plate 10 is placed inside the shoe as shown in Fig. 3 of the drawing, or it may be forced or pressed into said shoe as shown in Fig. 2 of the drawing. At the location of said threaded or tapped holes 12 and 13, holes are punched or otherwise made through the shoe to accommodate the shanks 15 of said studs 14, the lower extremities of which are then screwed or threaded into the plate. A similar application covers the applying of said strip 11 to a shoe, and also to the placing in position of the said studs 14. The antiskid or traction devices 18 are then screwed or threaded into said studs 14, at such times when the road conditions require the use of said device.

Having thus described my invention what I claim as new, and desire to protect by Letters Patent of the United States is as follows:

An antiskid and traction device for automobile tires comprising an inner cleat having screw threaded openings therein positioned in said tire, said openings being disposed in registration with apertures in said tire, removable socket members comprising a screw threaded shank portion adapted to be extended through the apertures in said tire and to be screwed into the threaded openings of said cleat and an enlarged head having a screw threaded recess therein adapted to co-act with said cleat in clamping said antiskid device on the tire, and a detachable projection comprising a point at one extremity and a shank at the other adapted to be screw threaded into the threaded recess of the head of said socket member.

In testimony whereof I have affixed my signature.

ALEXANDER VARGA.